United States Patent [19]

Parkinson

[11] Patent Number: 5,001,377
[45] Date of Patent: Mar. 19, 1991

[54] LUBRICATION SYSTEM WITH INLET AND OUTLET PACKETS

[75] Inventor: David D. Parkinson, Fenton, Mo.

[73] Assignee: MagneTek, Inc., Los Angeles, Calif.

[21] Appl. No.: 464,342

[22] Filed: Jan. 12, 1990

[51] Int. Cl.⁵ .................. F16C 19/00; H02K 5/173
[52] U.S. Cl. .................................. 310/90; 384/473
[58] Field of Search ............. 310/90; 384/462, 473, 384/474

[56] References Cited

U.S. PATENT DOCUMENTS

| | | | |
|---|---|---|---|
| 1,218,839 | 3/1917 | Daniel | 384/473 |
| 2,249,501 | 7/1941 | Teker | 384/474 |
| 2,337,403 | 12/1943 | Myers et al. | 384/473 |

FOREIGN PATENT DOCUMENTS

| | | | |
|---|---|---|---|
| 628635 | 10/1961 | Canada | 384/473 |
| 144545 | 6/1987 | Japan | 310/90 |

Primary Examiner—Steven L. Stephan
Assistant Examiner—D. L. Rebsch
Attorney, Agent, or Firm—Faegre & Benson

[57] ABSTRACT

A bearing lubrication system having an exterior bearing cap circumscribing a motor shaft and having an annular recess with an axially extending depth, divided into first and second arcuate portions in the recess, forming lubrication inlet and outlet pockets in the recess, with the inlet and outlet pockets separated by axially extending walls, each wall having a height less than the depth of the recess for permitting grease to flow from the inlet pocket to the outlet pocket. The recess further has a sloped surface on an inner circumferential wall thereof to direct grease towards an adjacent antifriction bearing. A grease metering shield in the form of a solid or perforated annular plate adjacent the bearing directs grease to the contact region between the inner race and the rolling elements of the bearing.

14 Claims, 4 Drawing Sheets

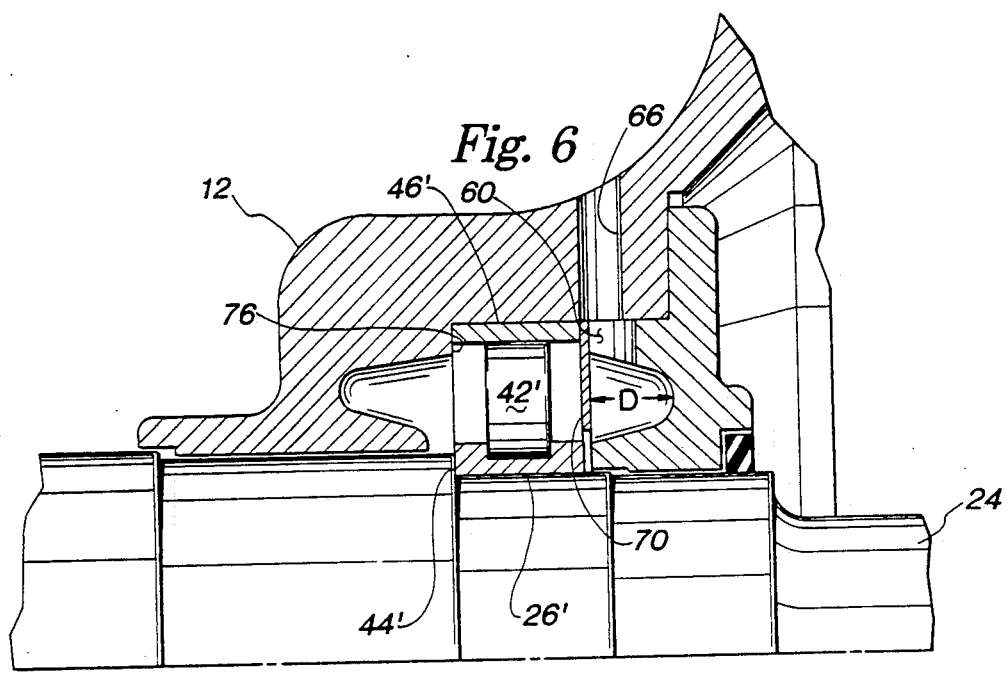
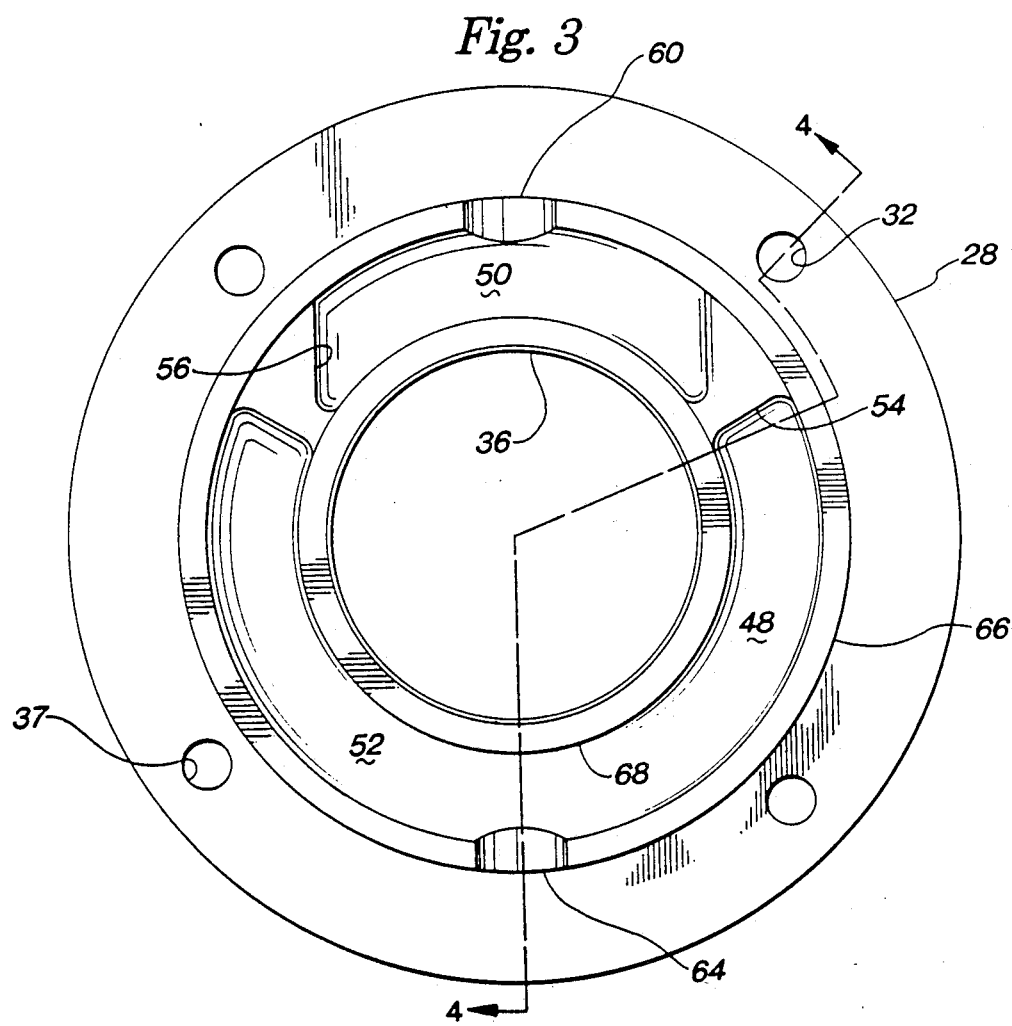

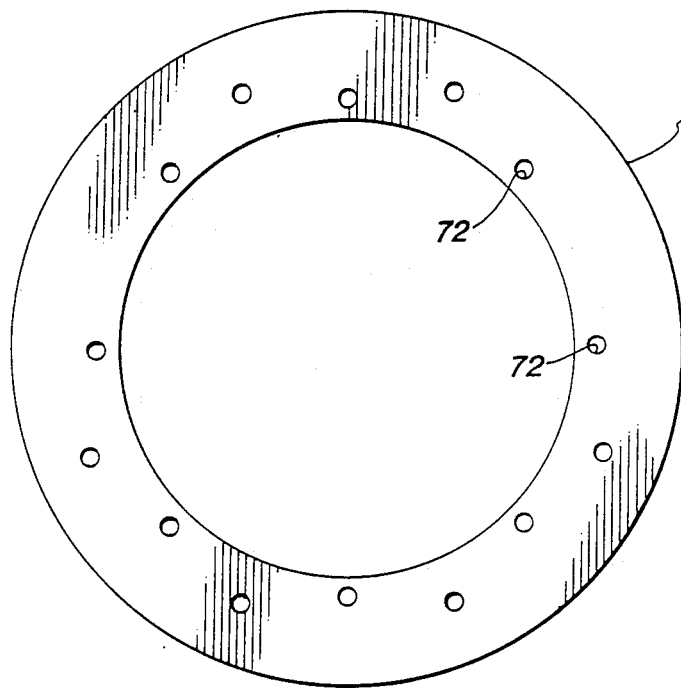
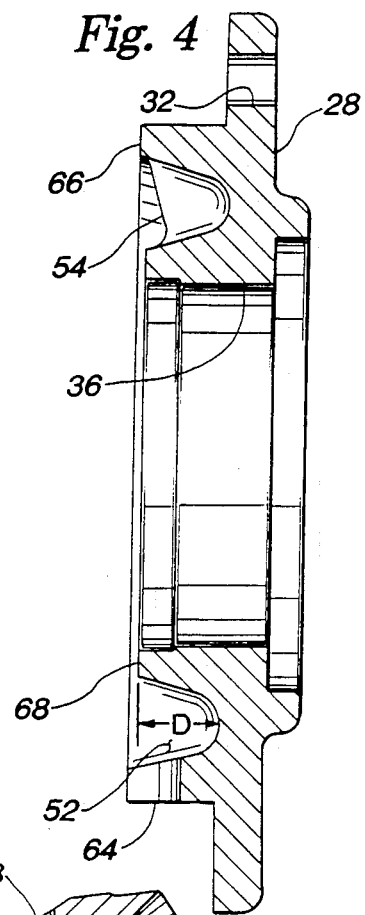
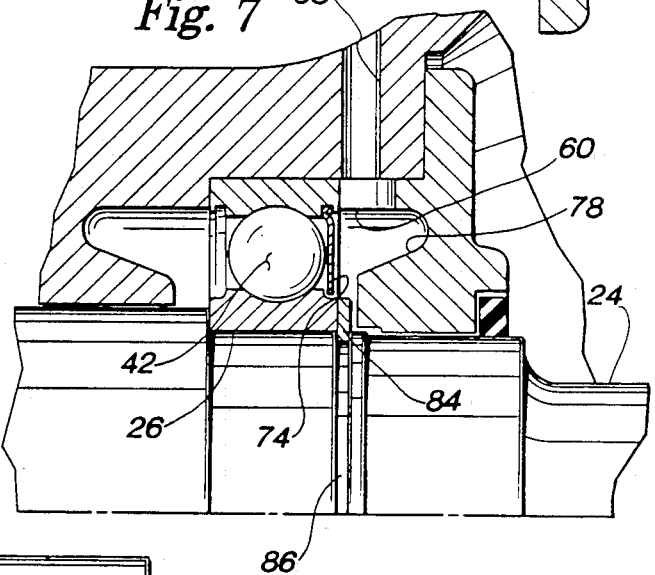
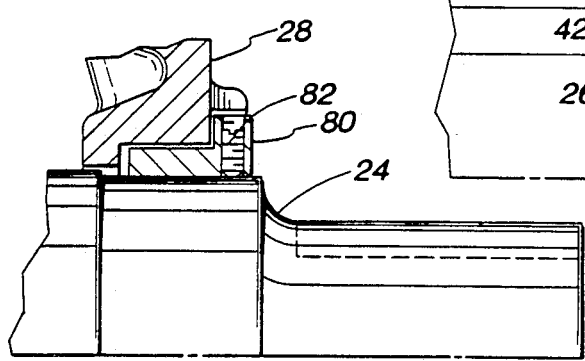

LUBRICATION SYSTEM WITH INLET AND OUTLET PACKETS

BACKGROUND OF THE INVENTION

This invention relates to electric motors and more particularly to lubrication systems for antifriction bearings supporting a rotating shaft in such motors.

DESCRIPTION OF THE DRAWINGS

FIG. 3 is a rear elevation view of a bearing cap useful in the practice of the present invention and shown in section in FIG. 2.

FIG. 4 is a section taken along line 4—4 of FIG. 3.

FIG. 5 is a front elevation view of a lubrication metering ring useful in the practice of the present invention.

FIG. 6 is a fragmentary vertical section view of an assembly using the metering ring of FIG. 5 in assembly.

FIG. 7 is a fragmentary vertical section view of an assembly showing a retaining ring modification.

FIG. 8 is a fragmentary vertical section view of an assembly showing an alternative shaft seal structure.

DETAILED DESCRIPTION

Figure 1:
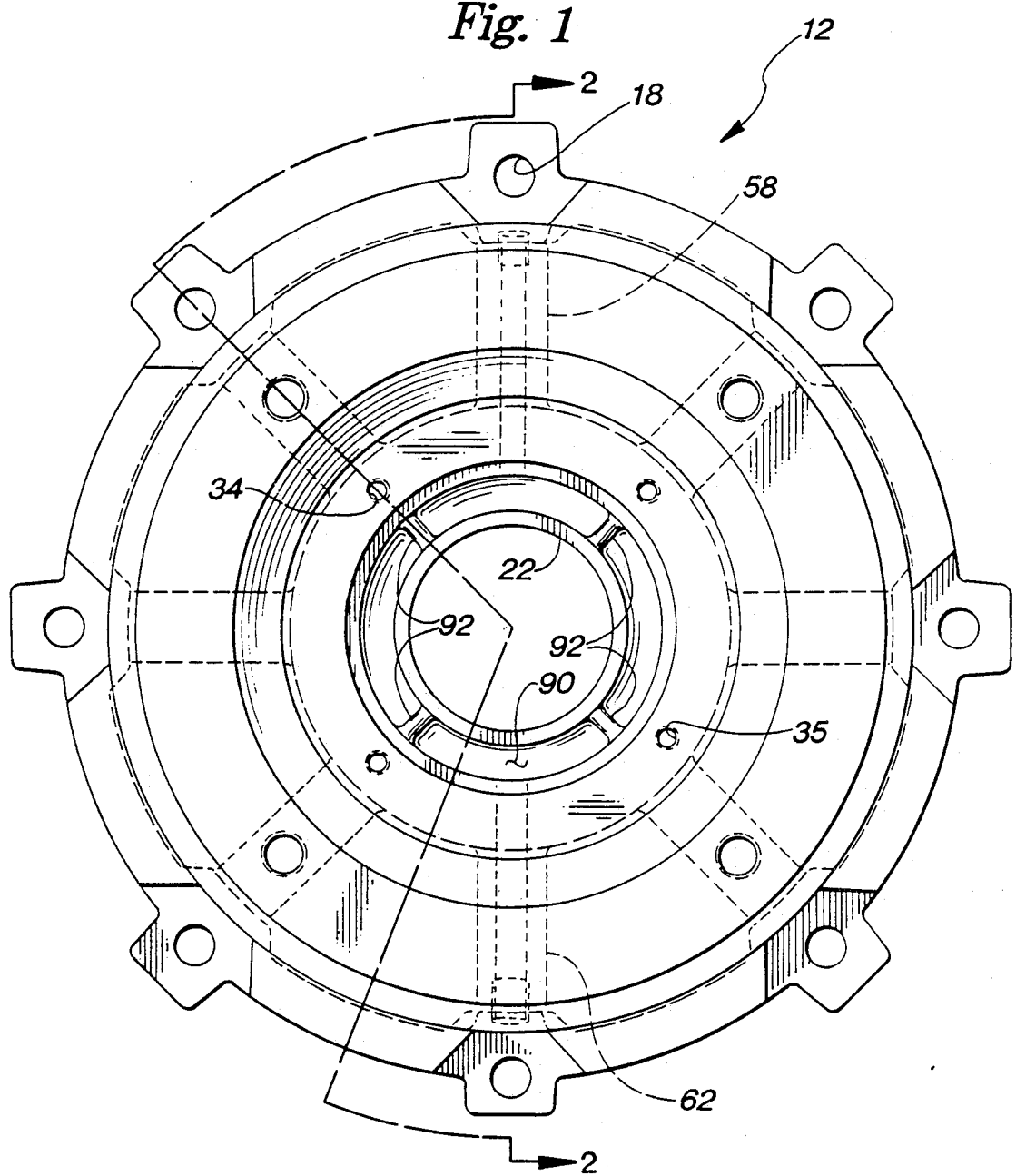
FIG. 1 is a front elevation view of a bearing bracket useful in the practice of the present invention.
Figure 2:
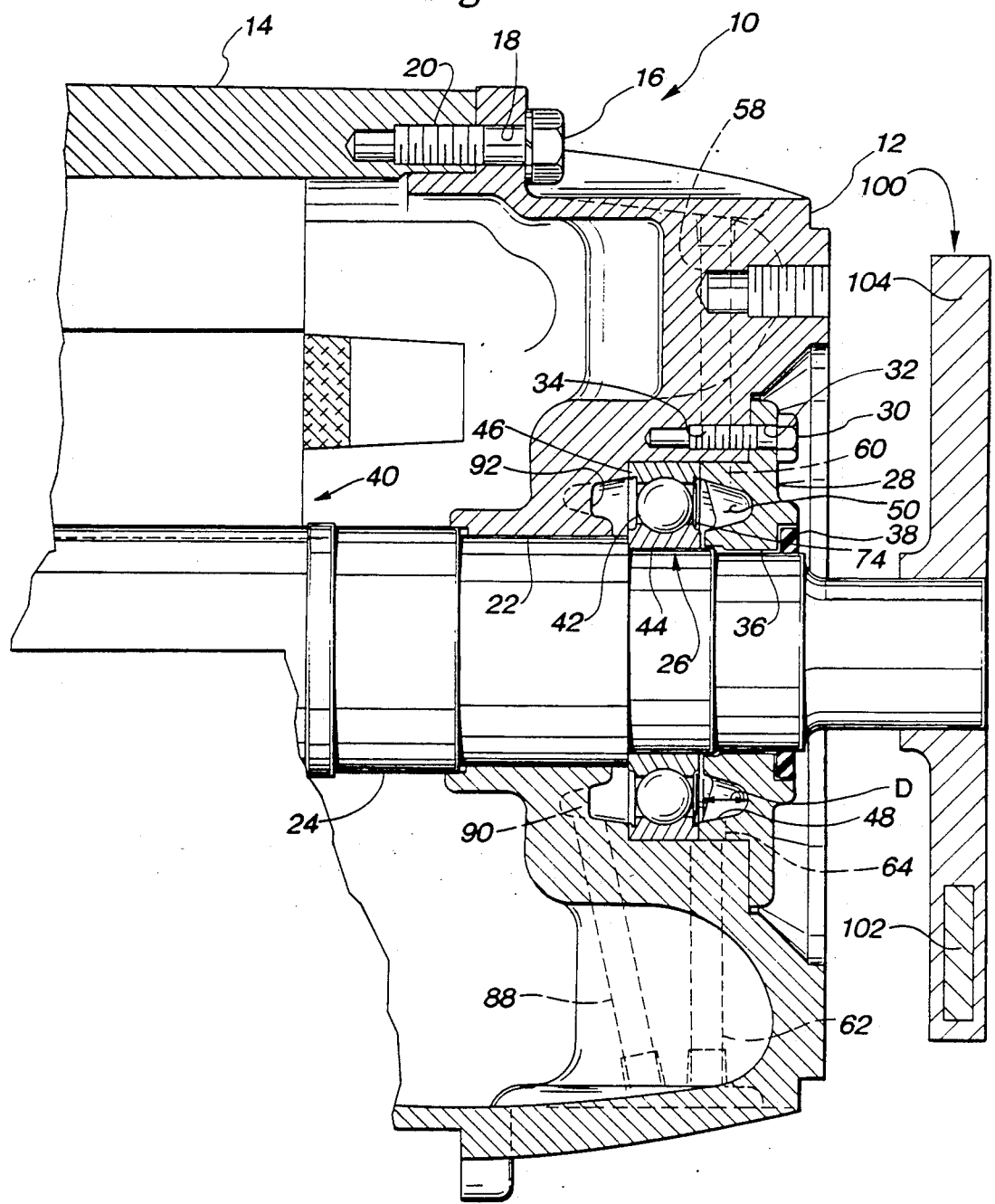
FIG. 2 is a partial assembly view in section of an electric motor with a view of the bearing bracket of FIG. 1 taken along line 2—2.

Referring now to FIGS. 1 and 2, an electric motor 10 has a bearing bracket 12 secured to a frame 14 by bolts 16 passing through apertures 18 in bracket 12 and received in threaded apertures 20 in frame 14. Bracket 12 has a central bore 22 through which an output shaft 24 is received. Shaft 24 is supported on antifriction bearing 26 in bracket 12. Bearing 26 is preferably enclosed by an exterior bearing cap 28 preferably secured to bearing bracket 12 by bolts 30 passing through apertures 32 and cap 28 and received in threaded apertures 34 in bracket 12. It may be noted that bracket 12 has one aperture 35 asymetrically positioned while cap 28 (see FIG. 3) has a corresponding aperture 37 similarly asymetrically positioned. Apertures 35 and 37 are aligned with each other and provide for proper circumferential alignment of cap 28 with bracket 12. Alternatively, other means of orienting cap 28 to bracket 12 may be used. Cap 28 also preferably has a central bore 36 and may have a seal 38 shown in simplified form in FIG. 2.

Output shaft 24 is preferably driven by a shaft-mounted rotor 40. The shaft 24 extends axially through bearing 26 which itself has rolling elements 42 in the form of balls between an inner race 44 adjacent to shaft 24 and an outer race 46 adjacent the bracket 12.

Referring now also to FIG. 3, the bearing cap 28 located in the exterior of bracket 12 has an annular recess 48 defined and enclosed by an outer circumferential wall 66 and an inner circumferential wall 68. Recess 48 has an axially extending depth D. Bearing cap 28 has a first arcuate portion 50 in the recess 48 forming a lubrication inlet pocket. Recess 48 further has a second arcuate portion 52 circumferentially adjacent first portion 50 and forming a lubrication outlet pocket. Recess 48 further has a pair of walls 54, 56 extending axially and partially separating the inlet and outlet pockets 50, 52. Each wall 54, 56 has a height (in the axial direction) less than the depth of recess 48 for permitting a grease-type lubricant to flow from the inlet pocket 50 to the outlet pocket 52.

A grease inlet passageway 58 is preferably provided in bracket 12. Passageway 58 communicates from the exterior of bearing bracket 12 to the lubrication inlet pocket 50. To that end an inlet relief 60 may be provided in outer circumferential wall 66.

A lubrication outlet passageway 62 communicates lubrication outlet pocket 52 to the exterior of the bearing bracket 12. An outlet relief 64 is preferably provided in outer circumferential wall 66 to enable grease in pocket 52 to pass to outlet passageway 62. There is preferably no relief in inner circumferential wall 68 of cap 28. It is to be understood that walls 54, 56 partition recess 48 into pockets 50, 52.

Referring now to FIGS. 5 and 6, a grease metering shield 70 is preferably interposed between cap 28 and bearing 26. In FIG. 6, bearing 26 is shown as a cylindrical roller bearing 26' to indicate that this invention may be practiced with various forms of antifriction bearings. Preferably shield 70 has a plurality of apertures 72 to permit flow of grease therethrough. Grease metering shield 70 is in the form of an annular plate having an outside diameter substantially equal to the outside diameter of the outer race 46' of bearing 26'. Plate or shield 70 preferably has an inside diameter larger than an outside diameter of the inner race 44' of bearing 26'.

As an alternative, and referring to FIGS. 2 and 7, a shield 74 of a conventional shielded bearing may serve as the grease metering shield in the practice of the present Bearing 26' is preferably received in a first annular recess 76 of bearing bracket 12. Inner race 44' is preferably received as a sliding fit on output shaft 24 while outer race 46' of the antifriction bearing 26' is press fit into recess 76. Alternatively, inner race 44' may be received on output shaft 24 in a press fit with outer race mating with recess 76 in a sliding fit. As a still further alternative, both inner and outer races 44', 46' may be press fit to their respective mating surfaces. It is to be understood that, while a type N cylindrical roller bearing is shown, any other suitable type (for example, NU, NJ or NUP) may be used in the practice of this invention.

A further feature of this invention is a sloped surface 78 angled toward bearing 26 such that lubrication grease is urged along sloped surface 78 toward the rolling elements 42 (or 42') of the antifriction bearing 26 (26').

Referring now to FIG. 8, an alternative shaft seal 80 may be provided on shaft 24 to seal cap 28 with respect to shaft 24. In this embodiment, a set screw or other fastening means 82 is provided to secure seal 80 to shaft 24.

If desired, a retaining ring 84 may be provided in a groove 86 on shaft 24 to retain bearing 26 to shaft 24.

Turning now to FIG. 2, a second outlet passageway 88 may be provided to permit egress of used grease from annual recess 90 in bracket 12.

Referring now also to FIG. 1, bracket 12 preferably has a plurality of vanes or walls 92 to assist in restricting inboard grease leakage along shaft 24.

It is to be understood that this invention is particularly suited for use with electric motors in those applications where an eccentric load 100 is driven by the motor. Elongated load 100 is made up of an eccentric weight 102 carried by overhung load 104. Such applications include vibratory feeders, shakers, sifters and other intentionally unbalanced equipment.

The invention is not to be taken as limited to all of the details thereof as modifications and variations thereof may be made without departing from the spirit or scope of the invention. For example, this invention is suitable for use with spherical roller bearings and tapered roller bearings as well as other types of antifriction bearings.

What is claimed is:

1. In an electric motor of the type having an output shaft driven by a shaft-mounted rotor and wherein the shaft extends axially through a bearing bracket and is supported by a bearing having rolling elements between an inner race adjacent the shaft and an outer race adjacent the bracket, an improved bearing lubrication system comprising a bearing cap located exteriorly of the bracket and having an annular recess with an axially extending depth, the bearing cap having:
    (i) a first arcuate portion in the recess forming a lubrication inlet pocket,
    (ii) a second arcuate portion in the recess circumferentially adjacent the first portion and forming a lubrication outlet pocket, and
    (iii) a pair of walls extending axially and partially separating the inlet and outlet pockets, each wall having a height less than the depth of the recess for permitting a grease-type lubricant to flow circumferentially from the inlet pocket to the outlet pocket.

2. The improved bearing lubrication system of claim 1 further comprising a grease inlet passageway in the bearing bracket communicating from the exterior of the bearing bracket to the lubrication inlet pocket.

3. The improved bearing lubrication system of claim 1 further comprising a lubrication outlet passageway communicating from the lubrication outlet pocket to the exterior of the bearing bracket.

4. The improved bearing lubrication system of claim 1 further comprising a grease metering shield interposed between the bearing cap and the bearing.

5. The improved bearing lubrication system of claim 4 wherein the grease metering shield comprises a shield in a shielded bearing.

6. The improved bearing lubrication system of claim 4 wherein the grease metering shield further comprises an annular plate.

7. The improved bearing lubrication system of claim 6 wherein the annular plate further comprises a plurality of perforations.

8. The improved bearing lubrication system of claim 6 wherein the annular plate further comprises:
    (i) an outside diameter substantially equal to an outside diameter of the outer race of the bearing, and
    (ii) an inside diameter larger than an outside diameter of the inner race of the bearing.

9. In an electric motor of the type having an output shaft driven by a shaft-mounted rotor and wherein the shaft extends axially through a bearing bracket and is supported by a bearing having rolling elements between an inner race adjacent the shaft and an outer race adjacent the bracket, an improved bearing lubrication system comprising a bearing cap located interiorly of the bracket and having an annular recess with an axially extending depth, the bearing cap having:
    (i) a first arcuate annular portion in the recess forming a lubrication inlet pocket,
    (ii) a second arcuate annular portion in the recess circumferentially adjacent the first portion and forming a lubrication outlet pocket, and
    (iii) a pair of walls extending axially and partially separating the inlet and outlet pockets, each wall having a height less than the depth of the recess for permitting a grease-type lubricant to flow circumferentially from the inlet pocket to the outlet pocket.

10. An improved lubrication system for use in motors of the type having an eccentric weight-type overhung load on an output shaft supported in a bearing bracket, the improved lubrication system comprising:
    (a) an antifriction bearing having inner and outer races separated by rolling elements and mounted to the motor wherein
        (i) the outer race is received in a first annular recess of the bearing bracket, and
        (ii) the inner race is received on an output shaft of the motor;
    (b) a bearing cap secured to the bearing bracket and having an annular recess:
        (i) located axially of the rolling elements of the bearing, and
        (ii) having first and second arcuate angular regions respectively forming lubrication inlet and outlet pockets separated by a plurality of dams located between the inlet and outlet pockets and partially blocking the circumferential flow of lubrication grease from the inlet pocket to the outlet pocket; and
    (c) inlet means for introducing lubrication grease to the inlet pocket from exterior of the motor; and
    (d) outlet means for permitting egress of lubrication grease from the outlet pocket to the exterior of the motor.

11. The improved lubrication system of claim 10 wherein the inlet pocket of the annular recess has a sloped surface angled toward the bearing such that lubrication grease urged along the sloped surface is directed toward the rolling elements of the bearing.

12. The improved lubrication system of claim 10 further comprising an annular plate having a generally planar radially oriented surface:
    (i) located between the bearing and the annular recess of the bearing cap, and
    (ii) having a radial clearance at an inner diameter of the annular plate sufficient to permit lubrication to pass from the annular recess to the bearing.

13. The improved lubrication system of claim 10 wherein the outer race of the antifriction bearing is received in a press fit in the first annular recess of the bearing bracket.

14. The improved lubrication system of claim 10 wherein the inner race of the antifriction bearing is received in a press fit on the output shaft of the motor.

* * * * *

UNITED STATES PATENT AND TRADEMARK OFFICE
CERTIFICATE OF CORRECTION

PATENT NO. : 5,001,377

DATED : March 19, 1991

INVENTOR(S) : David D. Parkinson

It is certified that error appears in the above-identified patent and that said Letters Patent is hereby corrected as shown below:

ON THE TITLE PAGE,
IN THE TITLE:

Change "PACKETS" TO -- POCKETS --.

Signed and Sealed this

Twenty-eighth Day of July, 1992

Attest:

DOUGLAS B. COMER

Attesting Officer

Acting Commissioner of Patents and Trademarks